United States Patent
Miyata et al.

(10) Patent No.: US 7,528,827 B2
(45) Date of Patent: May 5, 2009

(54) LIQUID CRYSTAL DISPLAY DEVICE

(75) Inventors: Kazuhiko Miyata, Habikino (JP); Jun Koyama, Sagamihara (JP); Hiroyuki Miyake, Atsugi (JP); Kei Takahashi, Atsugi (JP); Takeshi Osada, Atsugi (JP)

(73) Assignees: Semiconductor Energy Laboratory Co., Ltd., Kanagawa-ken (JP); Sharp Kabushiki Kaisha, Osaka (JP)

( * ) Notice: Subject to any disclaimer, the term of this patent is extended or adjusted under 35 U.S.C. 154(b) by 682 days.

(21) Appl. No.: 10/845,134

(22) Filed: May 14, 2004

(65) Prior Publication Data

US 2005/0007330 A1 Jan. 13, 2005

(30) Foreign Application Priority Data

May 21, 2003 (JP) ............................ 2003-144136
Sep. 19, 2003 (JP) ............................ 2003-327095

(51) Int. Cl.
*G06F 3/038* (2006.01)
(52) U.S. Cl. ........................................ 345/206; 345/98
(58) Field of Classification Search ......... 345/204–206, 345/87, 90, 92, 98
See application file for complete search history.

(56) References Cited

U.S. PATENT DOCUMENTS

| 6,388,652 | B1 | 5/2002 | Yamazaki et al. | |
|---|---|---|---|---|
| 6,778,164 | B2 | 8/2004 | Yamazaki et al. | |
| 6,956,324 | B2 | 10/2005 | Yamazaki | |
| 7,090,139 | B2 * | 8/2006 | Kasuga et al. | 235/494 |
| 7,256,776 | B2 | 8/2007 | Yamazaki et al. | |
| 2002/0057055 | A1 * | 5/2002 | Yamazaki et al. | 313/506 |
| 2002/0190374 | A1 * | 12/2002 | Nakajima et al. | 257/707 |
| 2003/0017652 | A1 | 1/2003 | Sakaki et al. | |
| 2004/0113548 | A1 * | 6/2004 | Yamazaki et al. | 313/506 |
| 2005/0167808 | A1 | 8/2005 | Sasaki et al. | |
| 2005/0199874 | A1 * | 9/2005 | Yamazaki et al. | 257/40 |
| 2006/0082568 | A1 * | 4/2006 | Yamazaki et al. | 345/207 |

(Continued)

FOREIGN PATENT DOCUMENTS

CN 1333921 1/2002

(Continued)

OTHER PUBLICATIONS

Office Action (Application No. 200410047514.9) dated May 18, 2007.

(Continued)

*Primary Examiner*—Ricardo L Osorio
(74) *Attorney, Agent, or Firm*—Eric J. Robinson; Robinson Intellectual Property Law Office, P.C.

(57) ABSTRACT

The invention provides a liquid crystal display device for displaying an image, having a signal processing function and a narrow flame. In the display device of the invention, a signal processing circuit is formed by thin film elements and at least a portion of the signal processing circuit is formed in the region that extended the region where a wiring connection portion is formed along a side of a substrate. By providing the signal processing circuit outside the sealed region of liquid crystal and the like and utilizing regions beside an FPC connected portion which tended to be a dead space conventionally, a display device having a narrow frame can be provided.

7 Claims, 12 Drawing Sheets

U.S. PATENT DOCUMENTS

2006/0141645 A1\* 6/2006 Yamazaki et al. ............. 438/22
2007/0184593 A1\* 8/2007 Tanaka et al. ............... 438/166
2007/0291022 A1 12/2007 Yamazaki et al.

FOREIGN PATENT DOCUMENTS

| JP | 11-084425 | 3/1999 |
| JP | 2000-267590 | 9/2000 |
| JP | 2000-292805 | 10/2000 |
| JP | 2001-242817 | 9/2001 |
| WO | WO 2002/077702 | 10/2002 |

OTHER PUBLICATIONS

Wu, J., *The PCB Design of Radio-Frequency Circuit*, Electronics Process Technology, Jan. 2003, vol. 24, pp. 19-22.

\* cited by examiner

FIG. 9
OUTPUT CD SERIAL DATA

LIQUID CRYSTAL DISPLAY DEVICE

BACKGROUND OF THE INVENTION

1. Field of the Invention

The present invention relates to a display device, and more particularly to a liquid crystal display device formed by a thin film semiconductor element.

2. Description of the Related Art

In recent years, portable phones are becoming more widely used in accordance with the advancement of communication technology, and it is expected that moving images or more amount of information will be transferred between them. Meanwhile, personal computers for mobile use that are light in weight are produced, and information terminals such as a PDA originated in an electronic data book are manufactured and also becoming widespread in the society. As a result of the development of display devices, most of those portable information devices are provided with flat panel displays such as a liquid crystal display device.

Among the active matrix liquid crystal display devices, a liquid crystal display device having a thin film element such as a low-temperature polysilicon thin film transistor (the thin film transistor is hereinafter referred to as a TFT) is advanced toward commercialization in recent years. By using the low-temperature polysilicon TFTs, not only pixels but a signal driver circuit can also be integrated in the periphery of the pixels. Therefore, it is quite advantageous in downsizing and achieving high resolution of the display, thus the further spread thereof is expected.

On the other hand, portable information devices are required to be equipped with not only a visible display function but other output functions such as an audio output function in particular. Displaying an image with audio makes the image more effective and amusing.

There are two types of audio signals for an audio output, which are an analog audio signal and a digital audio signal. The analog audio signal directly obtains audio by a microphone or an audio device of analog output, while the digital audio signal obtains signals from digital audio devices such as a CD, an MD, and a DVD.

Moreover, an electronic device such as an IC recorder using a semiconductor memory such as a memory card other than the aforementioned CD, MD and the like are becoming to be widely used as a digital audio signal source and expected to be spread further.

Figure 6:
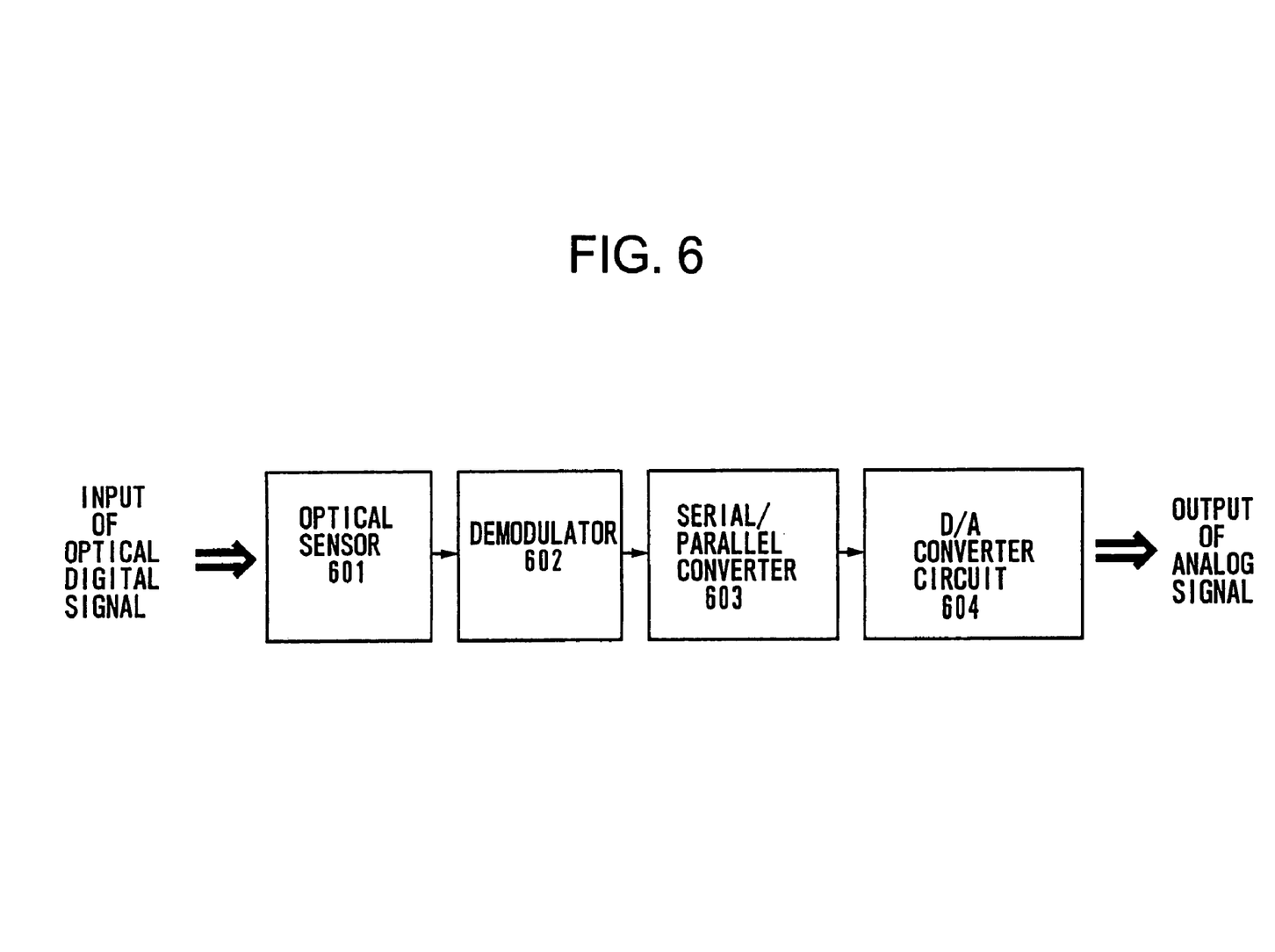
FIG. 6 is a block diagram of a digital audio signal processing circuit.
Figure 9:
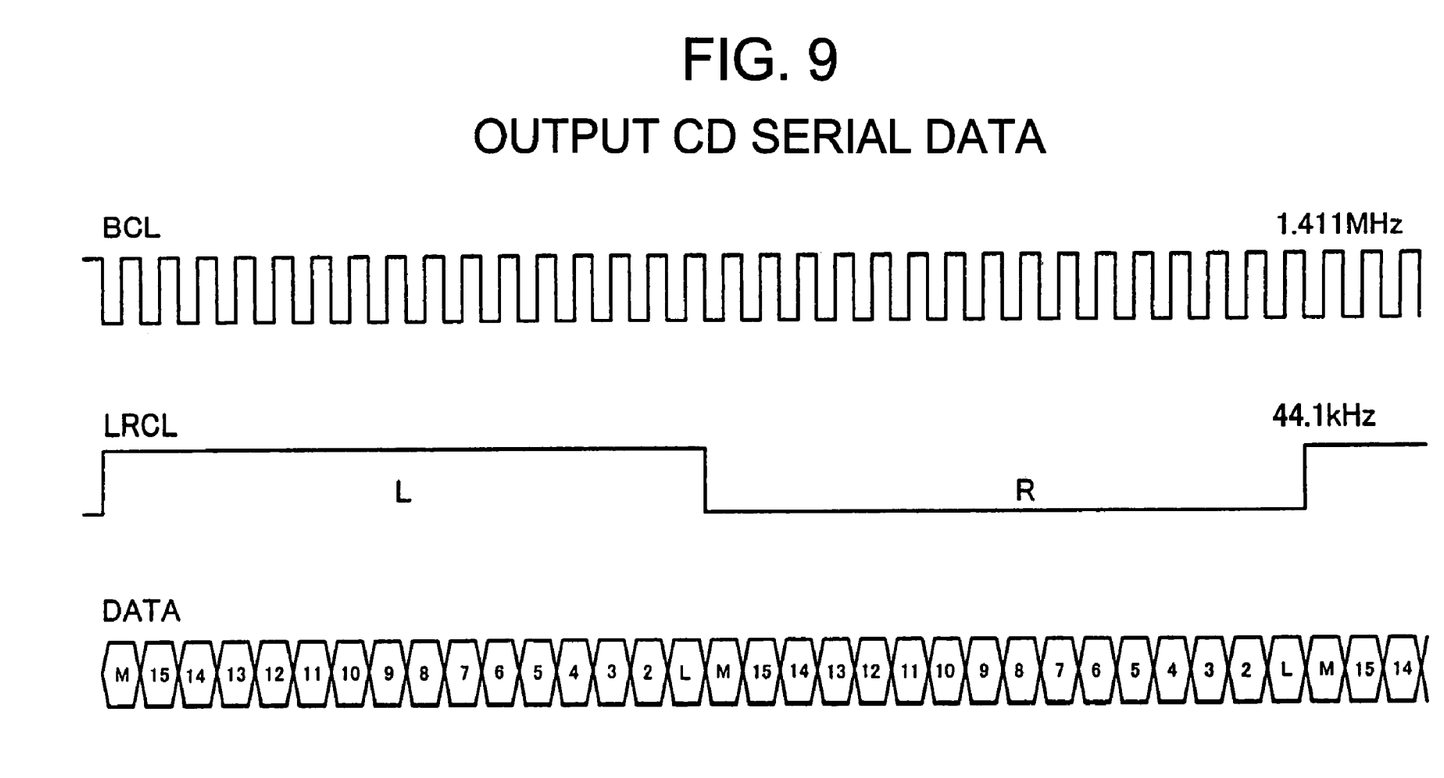
FIG. 9 is a diagram showing a digital signal format of a CD.

FIG. 6 is a block diagram showing a process of converting a digital audio signal into an analog audio signal. Most of the CD players and the like have optical outputs, which inputs an optical signal to an optical sensor 601 through fiber optics. The optical sensor 601 converts an optical signal into an electronic signal. The electronic signal is defined by CP-1201 standard of EIAJ and the like. Further, this signal is decoded into serial digital audio data by a demodulator 602 as shown in FIG. 9. There are three types of the decoded electronic signals as for the CD, which are a base clock of 1.411 MHz, an LR clock of 44.1 KHz, and digital audio signal data. The digital audio signal data is transferred to a serial-parallel converter circuit 603 in sequence from an MSB. The serial digital audio data is converted into parallel digital audio data by the serial-parallel converter circuit 603 and inputted to a D/A converter circuit 604 and converted into an analog audio signal.

Figure 5:
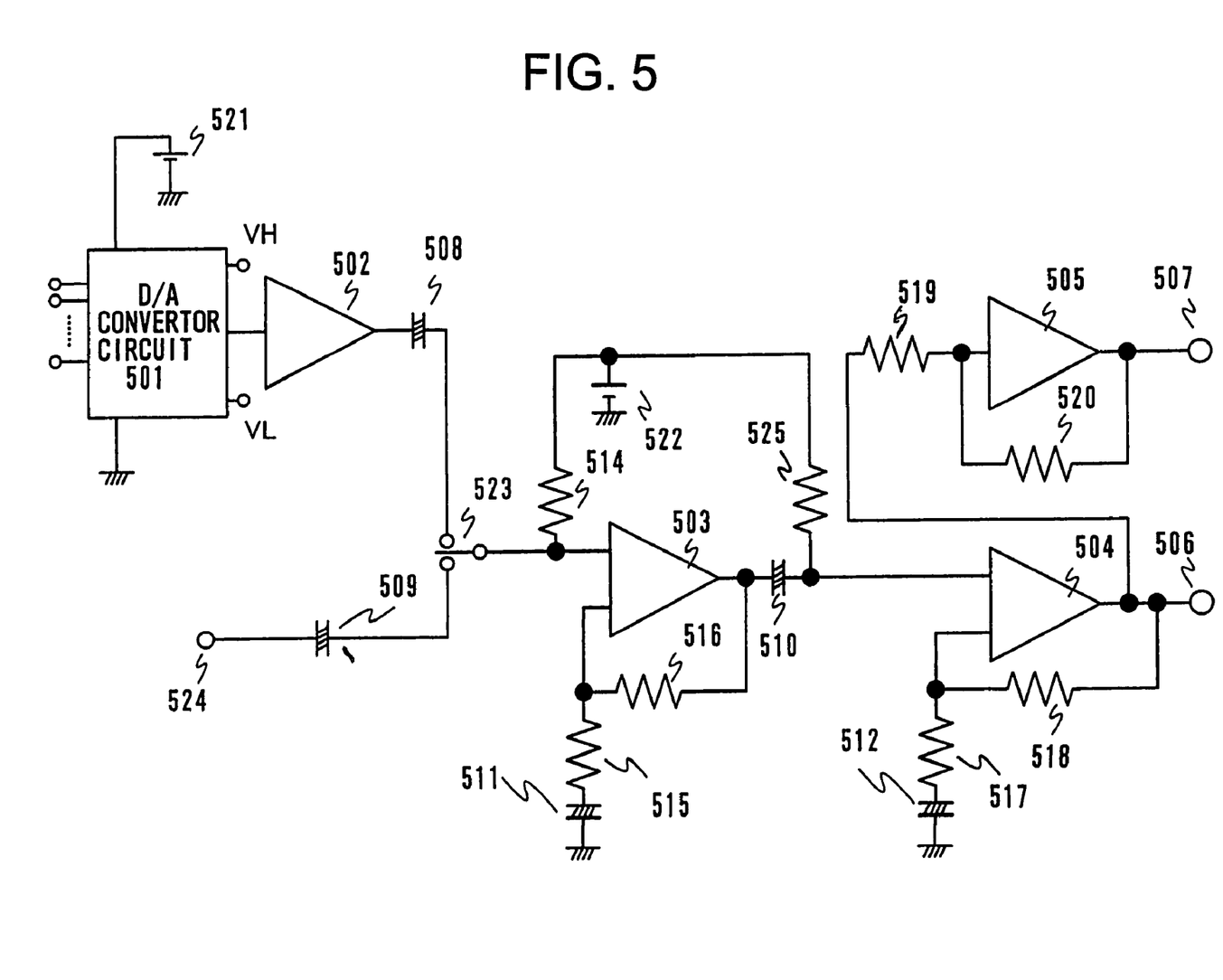
FIG. 5 is a block diagram of an audio signal processing circuit.

FIG. 5 is an example of a conventional audio signal processing circuit. A D/A converter circuit to speaker driving terminals are shown in FIG. 5. The audio signal processing circuit comprises a D/A converter circuit 501, a D/A converter buffer circuit 502, a preamplifier 503, a speaker driving non-inverted amplifier 504, a speaker driving inverted amplifier 505, speaker driving terminals 506 and 507, coupling capacitors 508, 509, and 510, filter capacitors 511 and 512, input resistors 514 and 525, a preamplifier feedback resistor 516, a resistor 517, speaker drive amplifier gain setting resistors 518 to 520, a D/A converter circuit power supply 521, a bias power supply 522, an analog-digital switch 523, and an analog signal input terminal 524.

Hereinafter described is an operation of the audio signal processing circuit. The parallel digital audio signal is converted into an analog audio signal by the D/A converter circuit 501 and inputted to the switch 523 through the D/A converter buffer circuit 502 and the coupling capacitor 508. On the other hand, an analog audio signal is inputted from the input terminal 524 to the switch 523 through the coupling capacitor 509. The switch 523 selects either the output signal from the D/A converter buffer circuit 502 or the analog input signal, and the selected signal is inputted to the preamplifier 503. The preamplifier 503 amplifies the signal using the gain determined in response to the proportion of the preamplifier feedback resistor 516 and the resistor 515. Subsequently, an output signal of the preamplifier 503 is amplified by the speaker driving non-inverted amplifier 504 and outputted to the speaker driving terminal 506. Here, an example of a driving method of BTL (Bridged Trans Less) in which opposite-phase signals are applied to the both terminals of the speaker is described. An output of the speaker driving terminal 506 is inverted by the speaker driving inverted amplifier 505 and outputted to the speaker driving terminal 507.

Figure 3A:
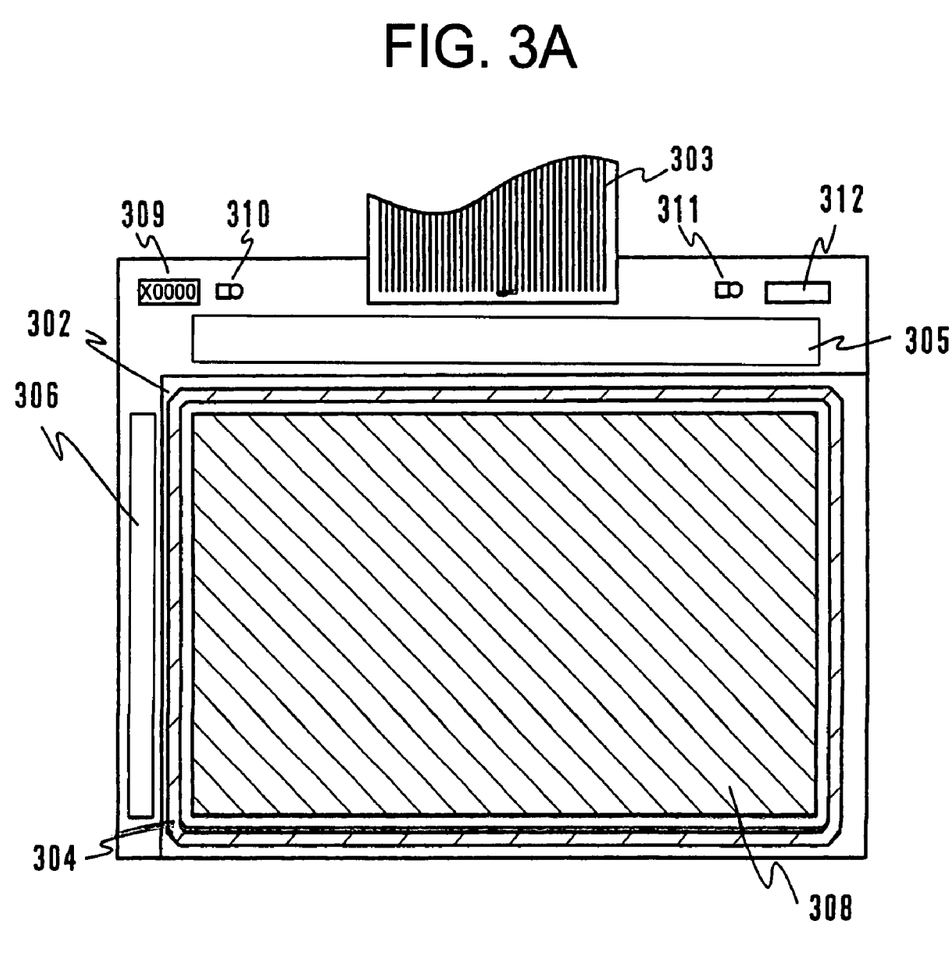
FIGS. 3A and 3B are a top plan view and a side view of the conventional liquid crystal display device of the invention respectively.
Figure 3B:
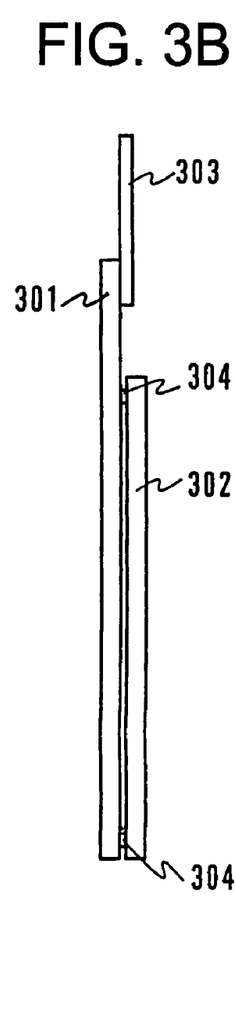

FIGS. 3A and 3B are a top plan view and a side view of a conventional display device. A pixel portion 308, a source signal driver circuit 305, and a gate signal driver circuit 306 are formed by TFTs on an insulating substrate 301. Further, a sealing member 304 is sandwiched between the insulating substrate 301 and the opposing substrate 302 for sealing liquid crystal and electronic signals are supplied to the liquid crystal display device externally via an FPC (Flexible Printed Circuit) 303. Moreover, a TEG 312 for verifying characteristics and alignment marks 310 and 311 for aligning the opposing substrate 302, a panel ID 309 and the like are provided beside the connection portion with the FPC on the panel.

Figure 2A:
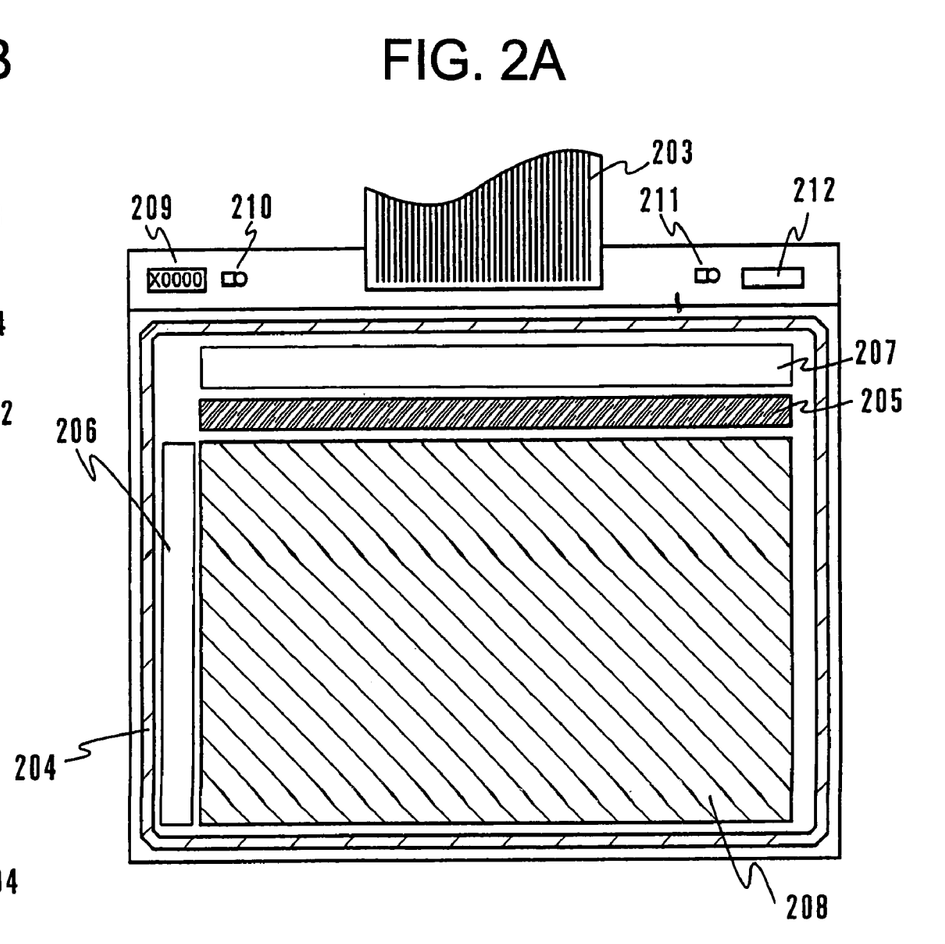
FIGS. 2A and 2B are a top plan view and a side view of the conventional liquid crystal display device of the invention respectively.
Figure 2B:
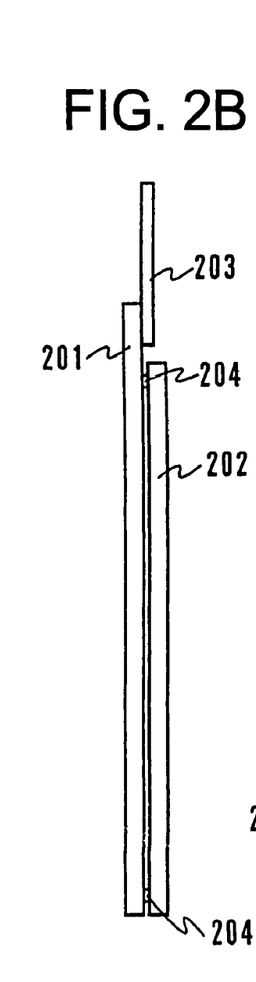

Further, another example of a conventional display device which is different from the aforementioned one is shown in FIGS. 2A and 2B. In FIG. 3A, TFTs surrounded with the sealing member 304 are only of the pixel portion 308, while a source signal driver circuit, a gate signal driver circuit, and a signal processing circuit are surrounded with a sealing member in FIG. 2A. A pixel portion 208, a source signal driver circuit 205, a gate signal driver circuit 206, and a signal processing circuit 207 are formed by TFTs on an insulating substrate 201. Further, a sealing member 204 is sandwiched between the insulating substrate 201 and an opposing substrate 202 for sealing liquid crystal and electronic signals are supplied to the liquid crystal display device externally via an FPC 203. Moreover, a TEG 212 for verifying characteristics and alignment marks 210 and 211 for aligning the opposing substrate 202, a panel ID 209 and the like are provided beside the connection portion with the FPC on the panel. A conventional technology can be referred in the following document. (For example, Patent Document 1)

[Patent Document 1]
Japanese Patent Laid-Open No. 2000-292805

SUMMARY OF THE INVENTION

In the conventional liquid crystal display device shown in FIGS. 3A and 3B, a signal processing circuit has to be provided externally, therefore, the number of external elements are increased. In the conventional example shown in FIGS. 2A and 2B, the number of external elements can be reduced, however, a signal processing circuit is included in the sealed region. Therefore, a periphery frame becomes large relatively to the display portion which makes the downsizing of the display device difficult.

In view of the aforementioned problems, it is one feature of the invention that a liquid crystal display device in which at least a portion of a signal processing circuit is disposed in a region which is an extended region of a region where the connection portion is formed, which extended region extends along one side of the substrate.

In accordance with another feature of the invention, the liquid crystal display device has, at least, a substrate, a pixel portion comprising a plurality of pixels, each of the plurality of pixels comprising a thin film element over the substrate, a wiring connection portion over a first portion of the substrate, and a signal processing circuit comprising a thin film element, at least a portion of the signal processing circuit being formed over a second portion of the substrate, wherein the first portion and the second portion are located beside a same edge of the substrate.

A liquid crystal display device has a pixel portion formed by a plurality of pixels by using thin film elements on a substrate. The liquid crystal display device comprises a wiring connection portion on the substrate and at least a portion of a signal processing circuit formed by thin film elements is disposed in a region which is an extended region of a region where the connection portion is formed, which extended region extends along one side of the substrate.

In accordance with one feature of the invention, the liquid crystal display device having a pixel portion formed by a plurality of pixels by using thin film elements on a substrate, the pixel portion is surrounded with a sealing member, the liquid crystal display device comprises a wiring connection portion on the substrate, at least a portion of a signal processing circuit formed by thin film elements is disposed in a region which is an extended region of a region where the connection portion is formed, which extended region extends along one side of the substrate, and the signal processing circuit is provided outside of the sealing member.

According to the aforementioned configurations, an area required for the signal processing circuit can be reduced in the sealed region. Thus, an area required for the frame can be reduced and the downsizing of a liquid crystal display device can be achieved.

In accordance with one feature of the invention, the liquid crystal display device having a pixel portion formed by a plurality of pixels by using thin film elements on a substrate, the liquid crystal display device comprises a wiring connection portion on the substrate, and at least a portion of an audio signal processing circuit formed by thin film elements is disposed in a region which is an extended region of a region where the connection portion is formed, which extended region extends along one side of the substrate.

In accordance with one feature of the invention, the liquid crystal display device having a pixel portion formed by a plurality of pixels by using thin film elements on a substrate, the pixel portion is surrounded with a sealing member, the liquid crystal display device comprises a wiring connection portion on the substrate, at least a portion of an audio signal processing circuit formed by thin film elements is disposed in a region which is an extended region of a region where the connection portion is formed, which extended region extends along one side of the substrate, and the audio signal processing circuit is provided outside of the sealing member.

According to the aforementioned configurations of the invention, the audio signal processing circuit may be an amplifier circuit.

According to the aforementioned configurations of the invention, the audio signal processing circuit may be a decoder.

According to the aforementioned configurations of the invention, the audio signal processing circuit may be a D/A converter circuit.

According to the aforementioned configurations, an area required for the audio signal processing circuit can be reduced in the sealed region. Thus, an area required for the frame can be reduced and a downsizing of a liquid crystal display device can be achieved.

In accordance with one feature of the invention, the liquid crystal display device having a pixel portion formed by a plurality of pixels by using thin film elements on a substrate, the liquid crystal display device comprises a wiring connection portion on the substrate, at least a portion of a signal processing circuit formed by thin film elements is disposed in a region which is an extended region of a region where the connection portion is formed, which extended region extends along one side of the substrate, the signal processing circuit comprises an analog signal processing circuit portion and a digital signal processing circuit portion, and the digital signal processing circuit portion is provided on the opposite side of the analog signal processing circuit portion with the wiring connection portion interposed therebetween.

In accordance with one feature of the invention, the liquid crystal display device having a pixel portion formed by a plurality of pixels by using thin film elements on a substrate, the liquid crystal display device comprises a wiring connection portion on the substrate, at least a portion of an audio signal processing circuit formed by thin film elements is disposed in a region which is an extended region of a region where the connection portion is formed, which extended region extends along one side of the substrate, and an input (terminal) of the signal processing circuit is provided on one side edge of the signal processing circuit and an output (terminal) of the signal processing circuit is provided on another side edge of the signal processing circuit.

In accordance with one feature of the invention, the liquid crystal display device having a pixel portion formed by a plurality of pixels by using thin film elements on a substrate, the liquid crystal display device comprises a wiring connection portion on the substrate, at least a portion of an audio signal processing circuit formed by thin film elements is disposed in a region which is an extended region of a region where the connection portion is formed, which extended region extends along one side of the substrate, wherein the signal processing circuit includes a decoder, and an input (terminal) of the decoder is provided on one side edge of the signal processing circuit and an output (terminal) of the decoder is provided on another side edge of the signal processing circuit.

This is advantageous for avoiding an interference of signals between the input and the output of the signal processing circuit.

In accordance with one feature of the invention, the liquid crystal display device having a pixel portion formed by a plurality of pixels by using thin film elements on a substrate, the pixel portion is surrounded with a sealing member, the liquid crystal display device comprises a wiring connection portion on the substrate, at least a portion of a signal processing circuit formed by thin film elements is disposed in a region which is an extended region of a region where the connection portion is formed, which extended region extends along one side of the substrate, the signal processing circuit is provided outside of the sealing member, the signal processing circuit comprises an analog signal processing circuit portion and a digital signal processing circuit portion, and the digital signal processing circuit is provided on the opposite side of the analog signal processing circuit portion with the wiring connection portion interposed therebetween.

In accordance with one feature of the invention, In the liquid crystal display device having a pixel portion formed by a plurality of pixels by using thin film elements on a substrate, the pixel portion is surrounded with a sealing member, the liquid crystal display device comprises a wiring connection portion on the substrate, at least a portion of a signal processing circuit formed by thin film elements is disposed in a region which is an extended region of a region where the connection portion is formed, which extended region extends along one side of the substrate, the signal processing circuit is provided outside of the sealing member, and an input (terminal) of the signal processing circuit is provided on one side edge of the signal processing circuit and an output (terminal) of the signal processing circuit is provided on another side edge of the signal processing circuit.

In accordance with one feature of the invention, the liquid crystal display device having a pixel portion formed by a plurality of pixels by using thin film elements on a substrate, the pixel portion is surrounded with a sealing member, the liquid crystal display device comprises a wiring connection portion on the substrate, at least a portion of a signal processing circuit formed by thin film elements is disposed in a region which is an extended region of a region where the connection portion is formed, which extended region extends along one side of the substrate, wherein the signal processing circuit includes a decoder, the signal processing circuit is provided outside of the sealing member, an input (terminal) of the decoder is provided on one side edge of the signal processing circuit and an output (terminal) of the decoder is provided on another side edge of the signal processing circuit.

According to the aforementioned configurations, an area required for the signal processing circuit can be reduced in the sealed region. Thus, an area required for the frame can be reduced and the downsizing of a liquid crystal display device can be achieved. Further, a digital signal can be prevented from leaking to an analog circuit, thus image and audio data in higher quality can be provided.

In accordance with one feature of the invention, the liquid crystal display device having a pixel portion formed by a plurality of pixels by using thin film elements on a substrate, the liquid crystal display device comprises a wiring connection portion on the substrate, at least a portion of a signal processing circuit formed by thin film elements is disposed in a region which is an extended region of a region where the connection portion is formed, which extended region extends along one side of the substrate, and at least a portion of the signal processing circuit is covered with a resin.

In accordance with one feature of the invention, the liquid crystal display device having a pixel portion formed by a plurality of pixels by using thin film elements on a substrate, the liquid crystal display device comprises a wiring connection portion on the substrate, at least a portion of a signal processing circuit formed by thin film elements is disposed in a region which is an extended region of a region where the connection portion is formed, which extended region extends along one side of the substrate, and at least a portion of the signal processing circuit is covered with an adhesive protection.

In accordance with one feature of the invention, the liquid crystal display device having a pixel portion formed by a plurality of pixels by using thin film elements on a substrate, the pixel portion is surrounded with a sealing member, the liquid crystal display device comprises a wiring connection portion on the substrate, at least a portion of a signal processing circuit formed by thin film elements is disposed in a region which is an extended region of a region where the connection portion is formed, which extended region extends along one side of the substrate, the signal processing circuit is provided outside of the sealing member, and at least a portion of the signal processing circuit is covered with a resin.

In accordance with one feature of the invention, the liquid crystal display device having a pixel portion formed by a plurality of pixels by using thin film elements on a substrate, the pixel portion is surrounded with a sealing member, the liquid crystal display device comprises a wiring connection portion on the substrate, at least a portion of a signal processing circuit formed by thin film elements is disposed in a region which is an extended region of a region where the connection portion is formed, which extended region extends along one side of the substrate, the signal processing circuit is provided outside of the sealing member, and at least a portion of the signal processing circuit is covered with an adhesive protection.

According to the aforementioned configurations, an area required for the signal processing circuit can be reduced in the sealed region. Thus, an area required for the frame can be reduced and the downsizing of a liquid crystal display device can be achieved. Further, the signal processing circuit can be protected from external mechanical shock or moisture, thus a reliability of the product is enhanced.

In accordance with one feature of the invention, the liquid crystal display device having a pixel portion formed by a plurality of pixels by using thin film elements on a substrate, the pixel portion is surrounded with a sealing member, the liquid crystal display device comprises a wiring connection portion on the substrate, at least a portion of an audio signal processing circuit formed by thin film elements is disposed in a region which is an extended region of a region where the connection portion is formed, which extended region extends along one side of the substrate, the audio signal processing circuit is provided outside of the sealing member, and the audio signal processing circuit comprises an amplifier circuit, and the amplifier circuit is provided adjacent to the wiring connection portion.

In accordance with one feature of the invention, the liquid crystal display device having a pixel portion formed by a plurality of pixels by using thin film elements on a substrate, the pixel portion is surrounded with a sealing member, the liquid crystal display device comprises a wiring connection portion on the substrate, at least a portion of an audio signal processing circuit formed by thin film elements is disposed in a region which is an extended region of a region where the connection portion is formed, which extended region extends along one side of the substrate, the audio signal processing circuit is provided outside of the sealing member, and the audio signal processing circuit comprises an amplifier circuit, and a wiring resistance between an output of the amplifier circuit and the wiring connection portion is 10 Ω or less.

According to the aforementioned configurations, an area required for the audio signal processing circuit can be reduced in the sealed region. Thus, an area required for the frame can be reduced and the downsizing of a liquid crystal display device can be achieved. Further, a fall in potential due to the wiring resistance can be prevented, thus it is a quite advantageous configuration for a speaker drive amplifier and the like which require a large current flow.

The invention provides a portable information device provided with the abovementioned liquid crystal display device.

In a conventional liquid crystal display device, a signal processing circuit is provided externally or internally in the sealed region of liquid crystal. Therefore, increase of external circuits and a frame area of a liquid crystal display are significant problems.

In the invention, by forming a signal processing circuit by thin film elements on the substrate and disposing at least a portion of the signal processing circuit in the region which is an extended region of a region where the connection portion is formed, which extended region extends along one side of the substrate, the signal processing circuit can be achieved without increasing external elements nor the frame area of a liquid crystal display device, thus a further downsizing of the liquid crystal display device is realized.

DETAILED DESCRIPTION THE INVENTION

Hereinafter described with reference to drawings are embodiment modes of the invention.

Figure 1A:
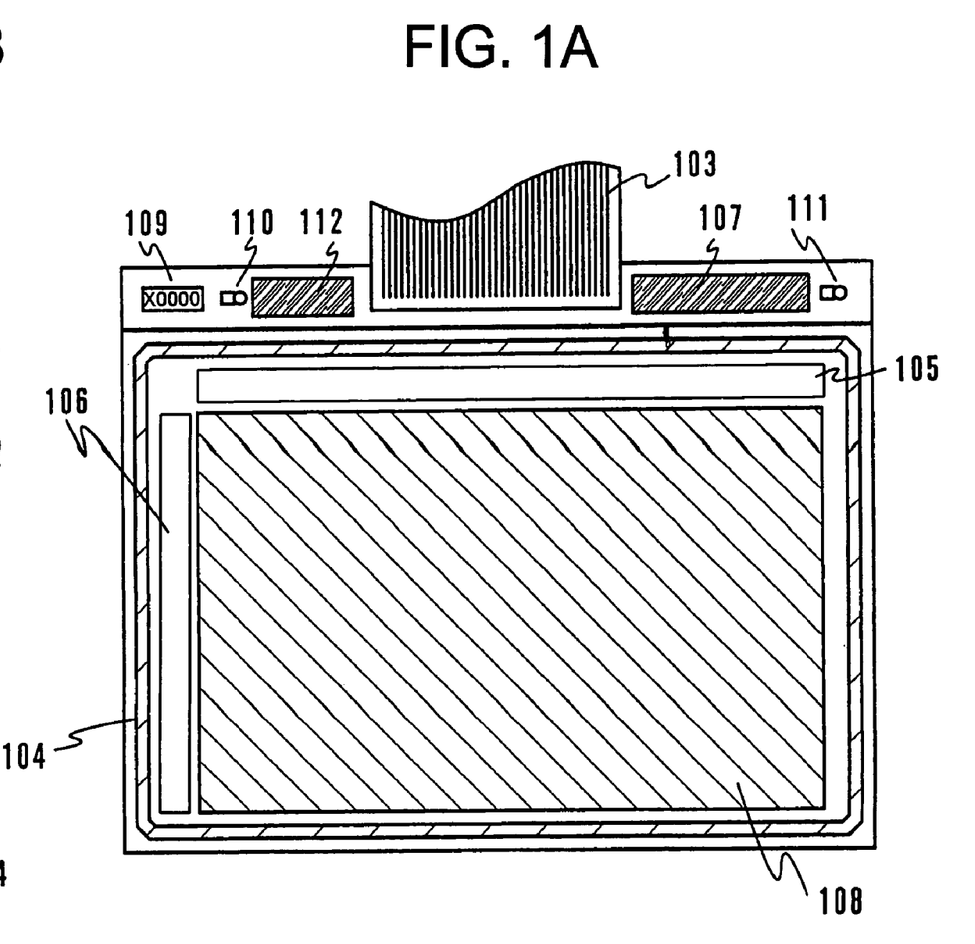
FIGS. 1A and 1B are a top plan view and a side view of the liquid crystal display device of the invention respectively.
Figure 1B:
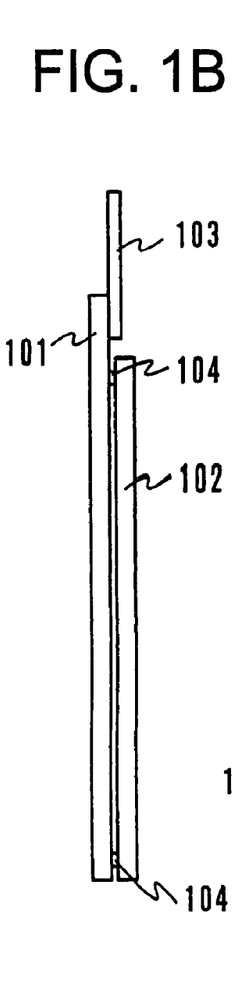

FIGS. 1A and 1B are a top plan view and a side view of the liquid crystal display device of the invention respectively. In this embodiment mode, a display device is configured with a pixel portion 108 formed by TFTs on a insulating substrate 101, a source signal driver circuit 105, a gate signal driver circuit 106, a sealing member 104 for sealing liquid crystal, and an opposing substrate 102 as shown in FIGS. 1A and 1B. An electronic signal for driving the liquid crystal display device is inputted via a wiring 103. Alignment marks 110 and 111, and a panel ID 109 are provided beside the wiring connection portion. The invention is different from the conventional configuration in that signal processing circuits 112 and 107 are provided in a region outside of the sealing member, which is an extended region of a region where the connection portion is formed in the direction where the pixel portion is not formed, that is beside the wiring connection portion in this embodiment mode. As described above, by disposing a signal processing-circuit in a region which is an extended region of a region where the connection portion is formed, which tended to be a dead space conventionally in the direction where the pixel portion is not formed, an area surrounded with the sealing member 104 can be reduced, thus the liquid crystal display device can be downsized.

It should be noted that the signal processing circuit described in this specification includes a variety of circuits such as an audio signal processing circuit, an image signal processing circuit, a controller circuit, a CPU, and a memory circuit.

EMBODIMENT 1

Figure 7A:
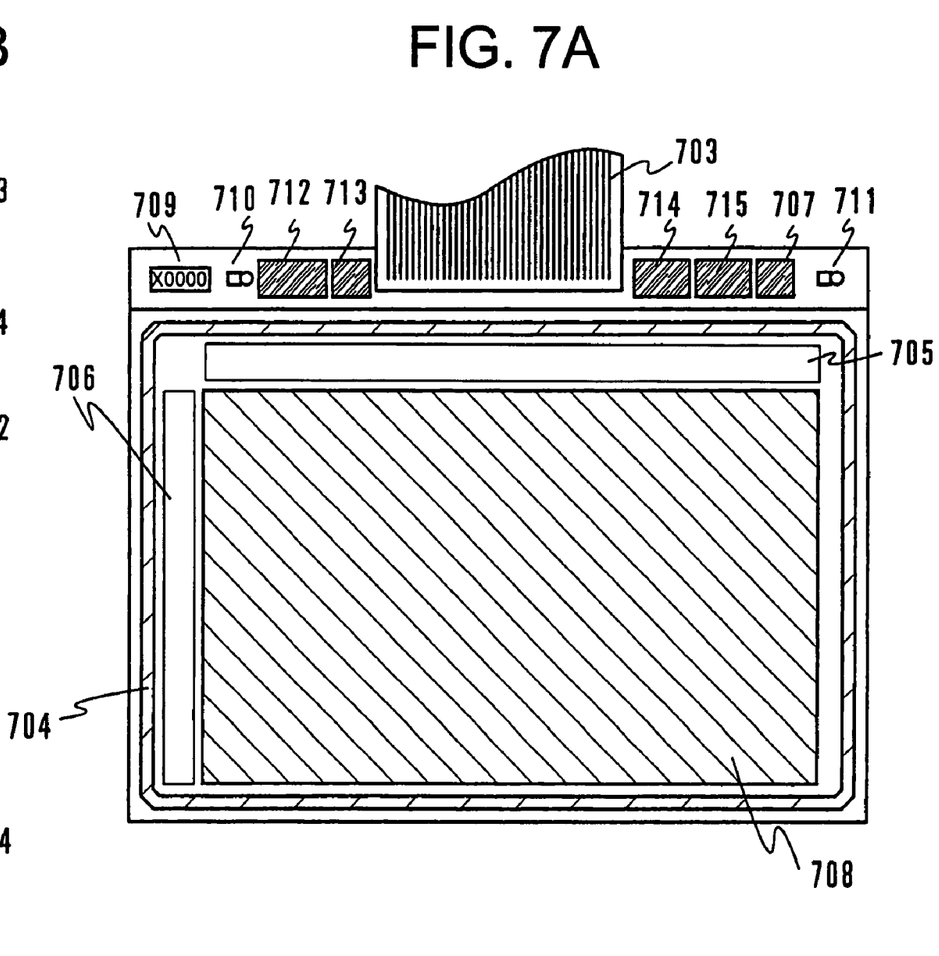
FIGS. 7A and 7B are a top plan view and a side view of the liquid crystal display device of the invention respectively.
Figure 7B:
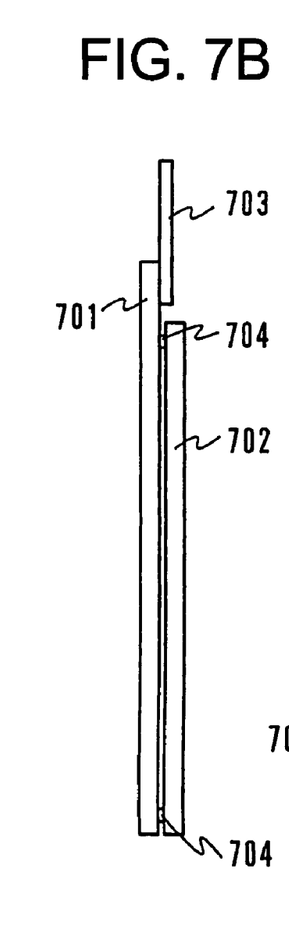

Hereinafter described is an embodiment in which an audio signal processing circuit is formed by thin film elements on an insulating substrate according to the invention respectively. The audio signal processing circuit shown in FIG. 5A is considered now. FIGS. 7A and 7B are a top plan view and a side view of the liquid crystal display device of the invention. As shown in FIGS. 7A and 7B, a display device is configured with a pixel portion 708 formed by TFTs on an insulating substrate 701, a source signal driver circuit 705, a gate signal driver circuit 706, a sealing member 704 for sealing liquid crystal, and an opposing substrate 702. An electronic signal for driving the display device is inputted via an FPC 703 which is an example of the wiring, and alignment marks 710 and 711, and a panel ID 709 are provided beside a connection portion with the FPC. As an audio signal processing circuit beside the FPC connection portion, a digital signal circuit such as a D/A converter circuit 712, a D/A buffer circuit 713, or an amplifier circuit such as a preamplifier 707, and speaker drive amplifiers 714 and 715 are provided.

In an embodiment shown in FIGS. 7A and 7B, a digital signal system (a D/A converter circuit and a D/A buffer circuit) and an analog signal system (a preamplifier and a speaker driving amplifier) are provided on the right and left of the connection portion with the FPC. According to this alignment, a digital signal can be prevented from leaking to an analog circuit, thus image and audio data in higher quality can be provided. A speaker driving amplifier is required to flow a large current for driving a speaker and is preferably disposed close to or adjacent to the FPC connection portion in order to prevent the fall in potential due to the wiring resistance. Further, it is preferable that a wiring resistance from an output terminal of an amplifier to the FPC be 10 Ω or less. It is also preferable that a power supply wiring and a ground wiring have resistance of 10 Ω or less. In addition, an image signal and an audio signal can be processed separately without interfering each other, thus an image and audio in high quality can be provided.

The digital signal system is not limited to the D/A converter circuit, but may include other functions such as a DSP and a PCM decoder.

In order to prevent a digital input signal from influencing a signal after D/A conversion, input and output terminals of a digital signal processing circuit such as a D/A converter circuit and a decoder may be provided on the opposed side edges of the signal processing circuit. (not shown)

EMBODIMENT 2

Figure 4A:
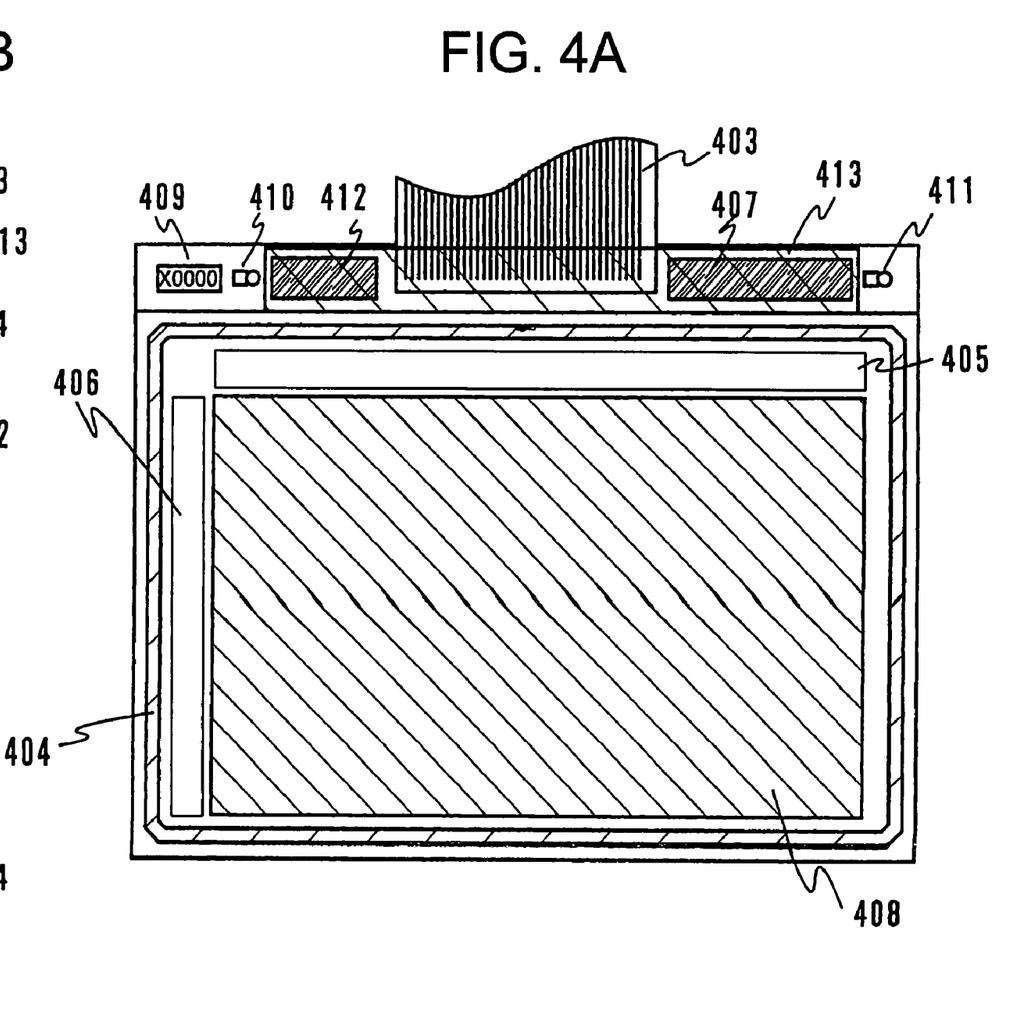
FIGS. 4A and 4B are a top plan view and a side view of the liquid crystal display device of the invention respectively.
Figure 4B:
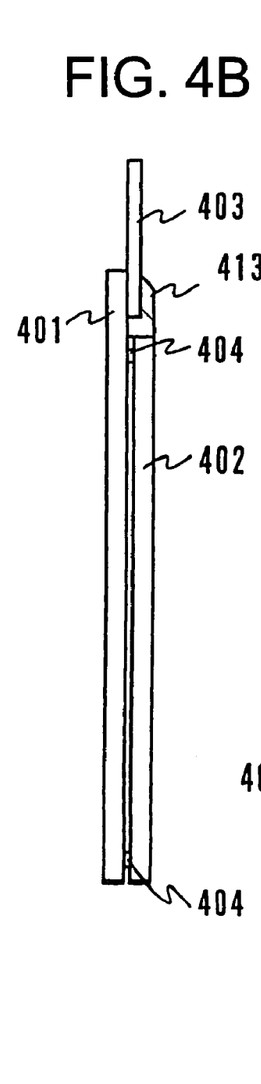

FIGS. 4A and 4B show an embodiment of the invention. FIGS. 4A and 4B are a top plan view and a side view of the liquid crystal display device of the invention respectively. In this embodiment, a display device is configured with a pixel portion 408 formed by TFTs on an insulating substrate 401, a source signal driver circuit 405, a gate signal driver circuit 406, a sealing member 404 for sealing liquid crystal, and an opposing substrate 402 as shown in FIGS. 4A and 4B. An electronic signal for driving the liquid crystal display device is inputted via an FPC 403, and alignment marks 410, 411, and a panel ID 409 are provided close to the FPC. Signal processing circuits 407 and 412 formed by TFTs are provided right beside the FPC.

Besides the aforementioned elements, a resin 413 is provided in this embodiment beside an FPC connection portion and the surface of the signal processing circuit. The resin 413 is provided in order to protect the signal processing circuits 407 and 412. By coating with a resin, the signal processing circuit can be protected from external mechanical shock or moisture, thus the reliability of the product is enhanced.

It should be noted the alignments marks 410 and 411 and a panel ID 409 are not coated with a resin in this embodiment shown in FIGS. 4A and 4B. In this manner, a resin coating may be carried out selectively.

In terms of a mechanical protection, a protection is not limited to a resin, but an adhesive insulator such as a tape may be applied as a protection or an insulating protection may be applied by using an adhesive. Further, a conductive protection may be applied by using an insulating adhesive. These materials may be used in combination with a resin.

EMBODIMENT 3

A liquid crystal display device formed in the aforementioned manner can be applied to a display portion of a variety of electronic devices. Such electronic devices each having the liquid crystal display device formed according to the invention as a display medium are described below.

Such electronic devices include a video camera, a digital camera, a head mounted display (a goggle display), a game machine, a car navigation system, a personal computer, a portable information terminal (a mobile computer, a portable phone, an electronic book or the like) and the like. Examples of those devices are shown in FIGS. 8A to 8G.

Figure 8A:
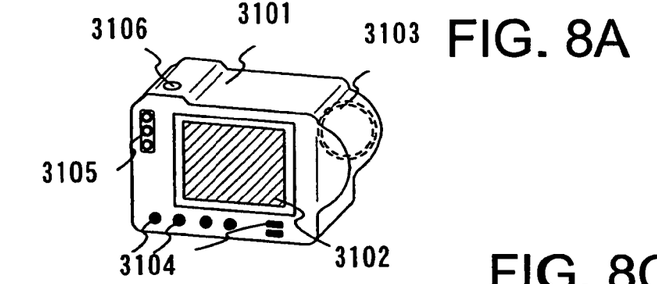
FIGS. 8A to 8G are diagrams of electronic devices each using the liquid crystal display device of the invention.

FIG. 8A illustrates a digital camera including a body 3101, a display portion 3102, an image receiving portion 3103, operation keys 3104, an external connection port 3105, a shutter 3106 and the like. By using the liquid crystal display device of the invention in the display portion 3102 of the digital camera, a small and light weight digital camera can be provided.

Figure 8B:
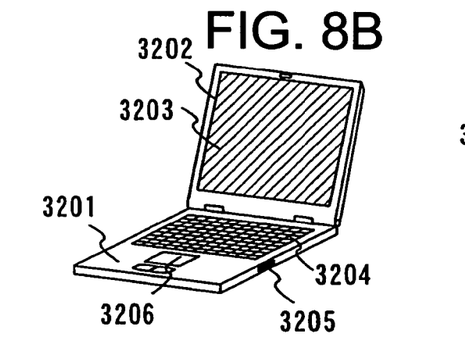

FIG. 8B illustrates a notebook personal computer including a body 3201, a housing 3202, a display portion 3203, a keyboard 3204, an external connection port 3205, a pointing mouse 3206 and the like. By using the liquid crystal display device of the invention in the display portion 3203, a small and light weight notebook personal computer can be provided.

Figure 8C:
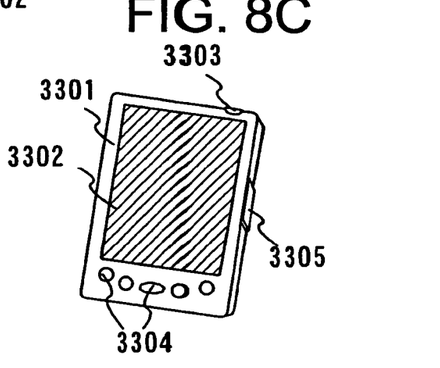

FIG. 8C illustrates a portable information terminal including a body 3301, a display portion 3302, a switch 3303, operation keys 3304, an infrared port 3305 and the like. By using the liquid crystal display device of the invention in the display portion 3202, a small and light weight portable information terminal can be provided.

Figure 8D:
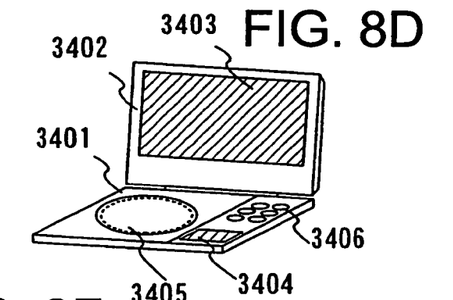

FIG. 8D illustrates an image reproduction device (specifically, a DVD reproduction device) provided with a recording medium including a body 3401, a housing 3402, a recording medium (CD, LD, DVD or the like) reading portion 3405, an operation switch 3406, a display portion (a) 3403, a display portion (b) 3404, and the like. The display portion (a) mainly displays image data while the display portion (b) mainly displays text data. The liquid crystal display device of the invention can be applied to the display portions (a) 3403 and (b) 3404 of the image reproduction device provided with the recording medium. By using the invention in a CD reproduction device, a game machine and the like, a small and light weight image reproduction device can be provided.

Figure 8E:
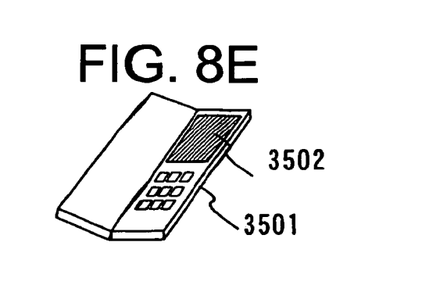

FIG. 8E illustrates a folding portable liquid crystal display device. By implementing a display portion 3502 formed by using the invention into a body 3501, a small and light weight portable liquid crystal display device can be provided.

Figure 8F:
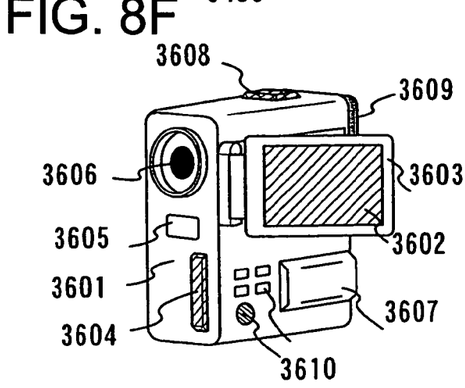

FIG. 8F illustrates a video camera including a body 3601, a display portion 3602, a housing 3603, an external connection port 3604, a remote control receiving portion 3605, an image receiving portion 3606, a battery 3607, an audio input portion 3608, an eyepiece portion 3609, operations keys 3610 and the like. By using the liquid crystal display device of the invention to the display portion 3602, a small and light weight video camera can be provided.

Figure 8G:
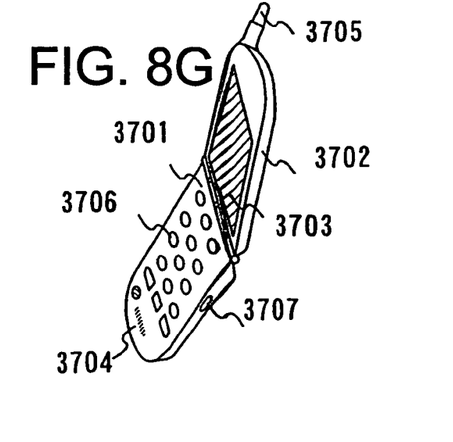

FIG. 8G illustrates a portable phone including a body 3701, a housing 3702, a display portion 3703, an audio input portion 3704, an antenna 3705, an operation key 3706, an external connection port 3707 and the like. By using the liquid crystal display device of the invention to the display portion 3703, a small and light weight portable phone can be provided.

As described above, application range of the invention is so wide that it can be applied to electronic devices of various fields. Further, the electronic devices described in this embodiment can be formed by any combination of the configurations in Embodiments 1 and 2.

EMBODIMENT 4

Figure 10:
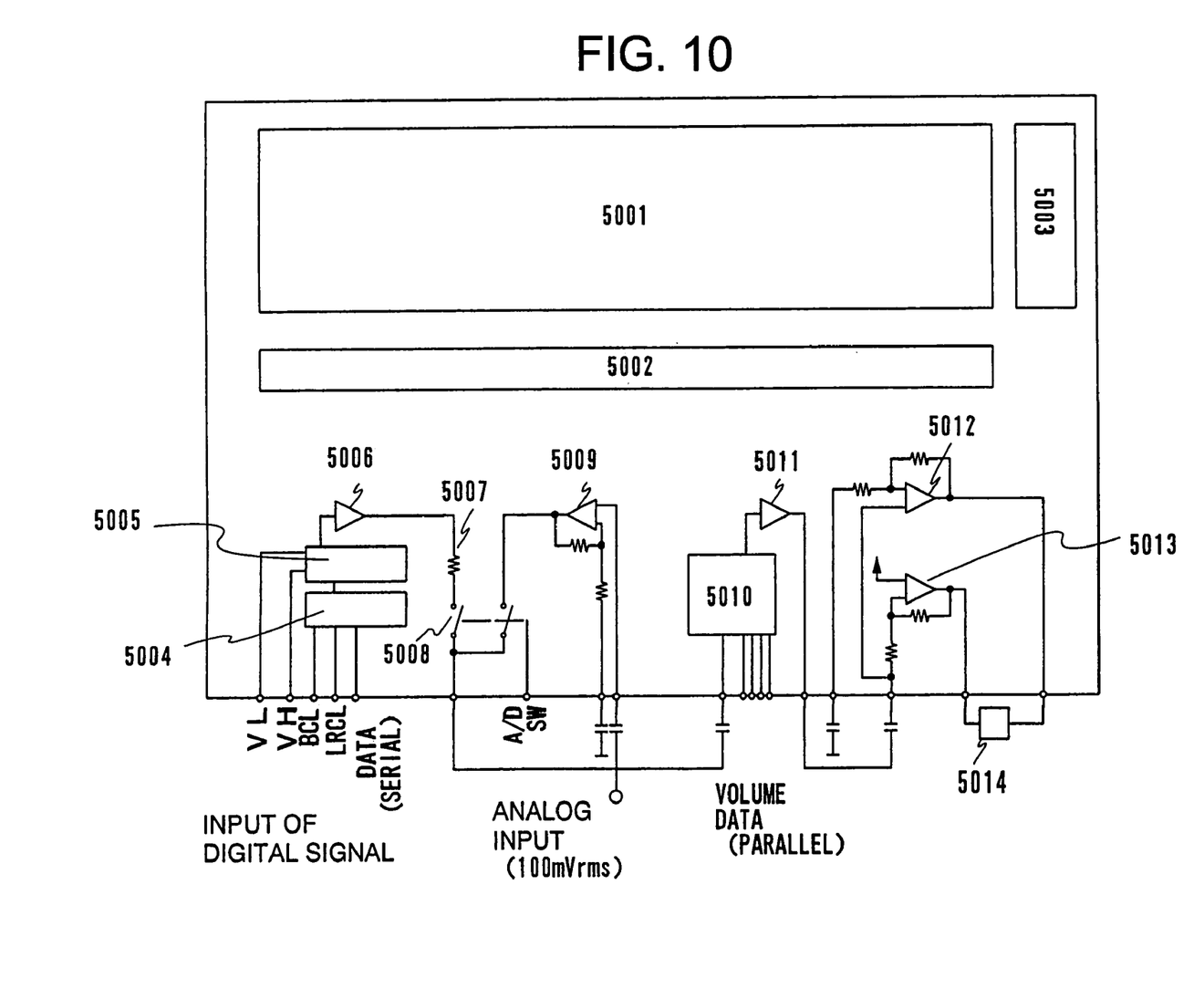
FIG. 10 shows an embodiment of a block of a liquid crystal display device integrated with an audio function.

FIG. 10 shows a fourth embodiment of the invention. In this embodiment, a pixel portion 5001, a source signal driver circuit 5002, a gate signal driver circuit 5003, a D/A converter circuit 5005, a serial-parallel converter circuit 5004, a D/A buffer amplifier 5006, a level control resistor 5007, a switch 5008, a preamplifier 5009, an electronic volume 5010, an electronic volume buffer amplifier 5011, a speaker driving non-inverted amplifier 5012, and a speaker driving inverted amplifier 5013 are formed in a liquid crystal display device by using thin film transistors.

Serial digital audio data is converted into parallel audio data by the serial-parallel converter circuit 5004. The serial-parallel converter circuit 5004 is formed by a shift register and a latch circuit. The parallel audio data is converted into an analog signal by the D/A converter circuit 5005 and inputted to the switch 5008 via the D/A buffer amplifier 5006 and the level control resistor 5007. On the other hand, an external analog audio signal is inputted to the switch 5008 after being amplified by the preamplifier 5009. Here, the switch 5008 selects either of the analog signal from the D/A converter circuit 5005 or the analog signal amplified by the preamplifier 5009.

An output of the switch 5008 is inputted to the electronic volume 5010. An output signal of the D/A buffer amplifier 5006 of the D/A converter circuit 5005 is divided in voltage between the level control resistor 5007 and an input resistor of the electronic volume 5010, thus a potential is controlled between the D/A buffer amplifier 5006 and an output of the preamplifier 5009.

An output of the electronic volume 5010 is inputted to the speaker driving non-inverted amplifier 5012 and the speaker driving inverted amplifier 5013. The output terminals of these amplifiers are connected in a BTL configuration for driving the speaker 5014.

Figure 12:
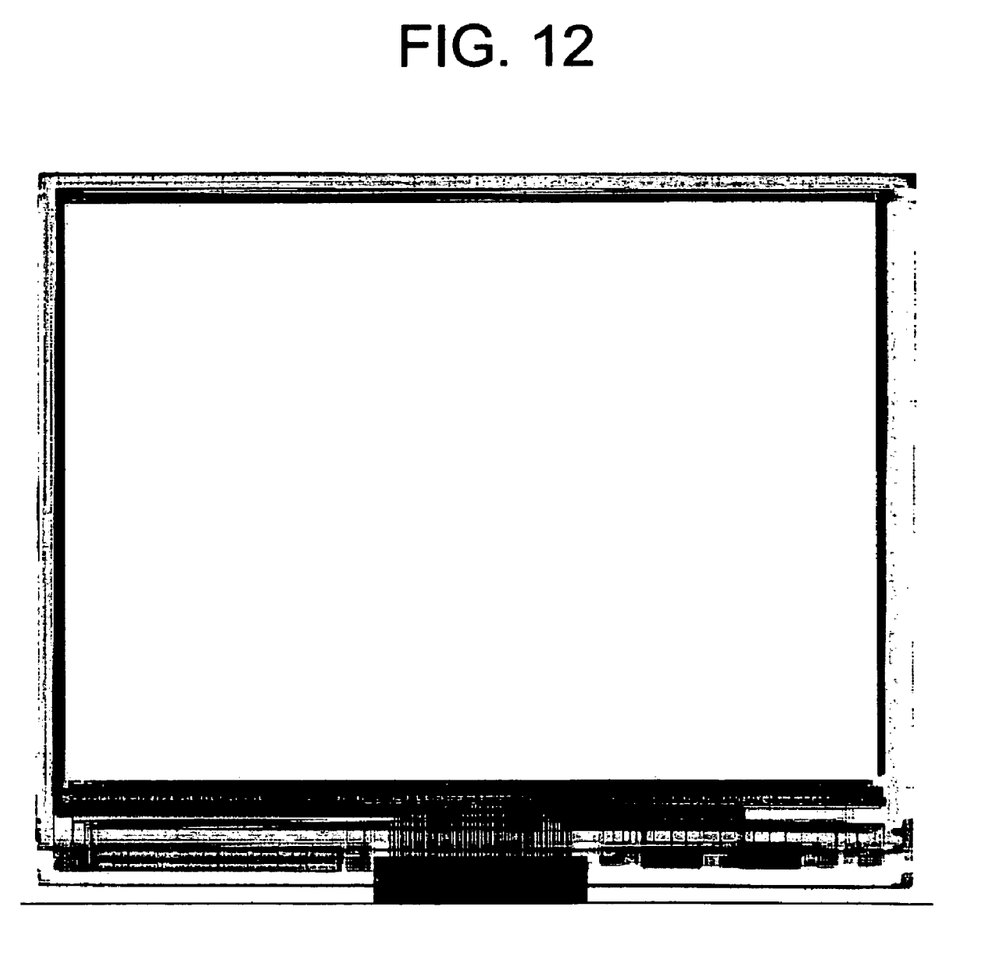
FIG. 12 is a picture of the liquid crystal display device using the invention.

FIG. 12 is a picture of a prototype of the liquid crystal display device shown in FIG. 10. This is a 4-inch VGA liquid crystal display device.

Figure 11:
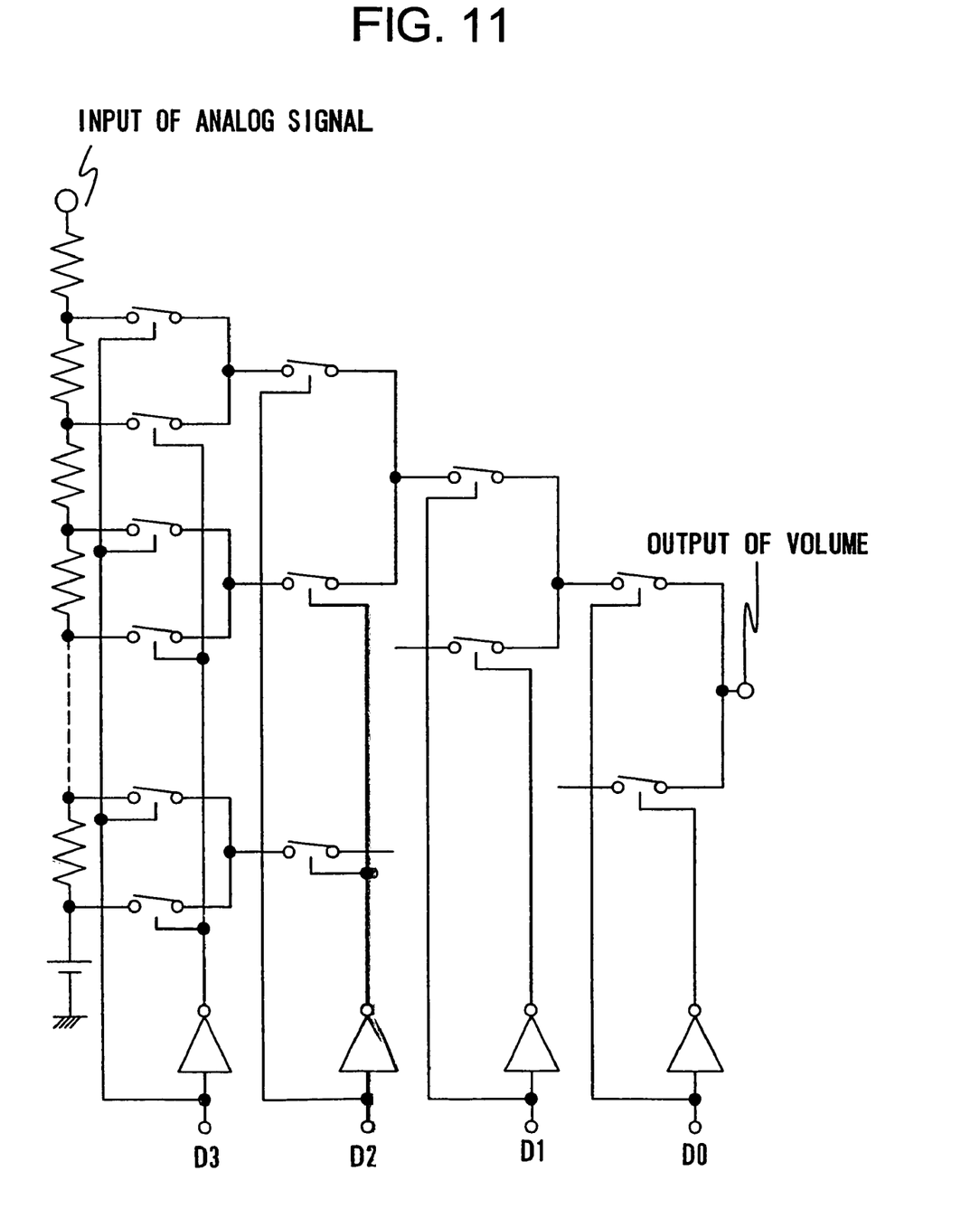
FIG. 11 shows an embodiment of the electronic volume.

FIG. 11 is an equivalent circuit of the electronic volume which is formed by a resistor, a switch, and a switch control circuit. An analog signal is inputted from an analog signal input terminal and divided in voltage by a resistor ladder. The divided signals are outputted to the volume output terminal through a combination of switches. Each of the switches is controlled by digital signals of D0 to D3. In the example of FIG. 11, 4-bit signals are processed, however, the invention is not limited to four bits. Further, a digital signal can be amplified by using a level shifter and the like appropriately.

Although the present invention has been fully described by way of Embodiment Modes and Embodiments with reference to the accompanying drawings, it is to be understood that various changes and modifications will be apparent to those skilled in the art. Therefore, unless otherwise such changes and modifications depart from the scope of the present invention hereinafter defined, they should be constructed as being included therein.

What is claimed is:

1. A liquid crystal display device comprising:
a substrate;
a pixel portion comprising a plurality of pixels, each of the plurality of pixels comprising a thin film element over the substrate;
a wiring connection portion over a first portion of the substrate; and
a signal processing circuit comprising a thin film elemet, at least a portion of the signal processing circuit being formed over a second portion of the substrate;
wherein the first portion and the second portion are located beside a same edge of the substrate,
wherein the signal processing circuit comprises an analog signal processing circuit and a digital signal processing circuit, and
wherein the digital signal processing circuit is provided on an opposite side of the analog signal processing circuit with the wiring connection portion interposed therebetween.

2. A liquid crystal display device comprising:
a substrate;
a pixel portion comprising a plurality of pixels, each of the plurality of pixels comprising a thin film element over the substrate;
a sealing member surrounding the pixel portion;
a wiring connection portion over a first portion of the substrate; and
a signal processing circuit comprising a thin film element, at least a portion of the signal processing circuit being formed over a second portion of the substrate,
wherein the first portion and the second portion are located beside a same edge of the substrate,
wherein the signal processing circuit is provided outside of the sealing member,
wherein the signal processing circuit comprises an analog signal processing circuit and a digital signal processing circuit, and
wherein the digital signal processing circuit is provided on an opposite side of the analog signal processing circuit with the wiring connection portion interposed therebetween.

3. A liquid crystal display device comprising:
a substrate;
a pixel portion comprising a plurality of pixels, each of the plurality of pixels comprising a thin film element over the substrate;
a wiring connection portion over the substrate; and
an analog signal processing circuit and a digital signal processing circuit, each comprising a thin film element,
wherein the analog signal processing circuit and the digital signal processing circuit are provided on an opposite side with each other along one edge of the substrate with the wiring connection portion interposed therebetween, and
wherein at least a portion of the analog or the digital signal processing circuit is covered with a resin.

4. A liquid crystal display device comprising:
a substrate;
a pixel portion comprising a plurality of pixels, each of the plurality of pixels comprising a thin film element over the substrate;
a wiring connection portion over the substrate; and
an analog signal processing circuit and a digital signal processing circuit, each comprising a thin film element,
wherein the analog signal processing circuit and the digital signal processing circuit are provided on an opposite side with each other along one edge of the substrate with the wiring connection portion interposed therebetween, and
wherein at least a portion of the analog or the digital signal processing circuit is covered with an adhesive protection.

5. A liquid crystal display device comprising:
a substrate;
a pixel portion comprising a plurality of pixels, each of the plurality of pixels comprising a thin film element over the substrate;
a sealing member surrounding the pixel portion;
a wiring connection portion over the substrate; and
an analog signal processing circuit and a digital signal processing circuit, each comprising a thin film element,
wherein the analog signal processing circuit and the digital signal processing circuit are provided on an opposite side with each other along one edge of the substrate with the wiring connection portion interposed therebetween,
wherein each of the analog signal processing circuit and the digital signal processing circuit is provided outside of the sealing member, and
wherein at least a portion of the analog or the digital signal processing circuit is covered with a resin.

6. A liquid crystal display device comprising:
a substrate;
a pixel portion comprising a plurality of pixels, each of the plurality of pixels comprising a thin film element over the substrate;
a sealing member surrounding the pixel portion;
a wiring connection portion over the substrate; and
an analog signal processing circuit and a digital signal processing circuit, each comprising a thin film element,
wherein the analog signal processing circuit and the digital signal processing circuit are provided on an opposite side with each other along one edge of the substrate with the wiring connection portion interposed therebetween,
wherein each of the analog signal processing circuit and the digital signal processing circuit is provided outside of the sealing member, and
wherein at least a portion of the analog or the digital signal processing circuit is covered with an adhesive protection.

7. A portable information device provided with the liquid crystal display device according to any one of claims 1, 2 and 3-6.

* * * * *